(12) United States Patent
Draht et al.

(10) Patent No.: US 9,149,863 B2
(45) Date of Patent: Oct. 6, 2015

(54) SETTING DEVICE, SUPPLY MODULE FOR THE SETTING DEVICE, AND A JOINING METHOD FOR CONNECTING AT LEAST TWO COMPONENTS

(75) Inventors: Torsten Draht, Schloss Holte (DE); Berthold Huhn, Steinhagen (DE); Bernd Haesler, Halle/Westfalen (DE); Marion Keiser, Detmold (DE)

(73) Assignee: Bollhoff Verbindungstechnik GmbH (DE)

( * ) Notice: Subject to any disclaimer, the term of this patent is extended or adjusted under 35 U.S.C. 154(b) by 518 days.

(21) Appl. No.: 13/502,270

(22) PCT Filed: Oct. 13, 2010

(86) PCT No.: PCT/EP2010/006272
§ 371 (c)(1),
(2), (4) Date: Jul. 2, 2012

(87) PCT Pub. No.: WO2011/045054
PCT Pub. Date: Apr. 21, 2011

(65) Prior Publication Data
US 2012/0260491 A1 Oct. 18, 2012

(30) Foreign Application Priority Data
Oct. 16, 2009 (DE) .......... 10 2009 049 616

(51) Int. Cl.
*B23P 11/00* (2006.01)
*B21J 15/10* (2006.01)
(Continued)

(52) U.S. Cl.
CPC ............... *B21J 15/025* (2013.01); *B21D 39/03* (2013.01); *B21J 15/10* (2013.01); *B23K 11/314* (2013.01); *Y10T 29/49956* (2015.01); *Y10T 29/5377* (2015.01)

(58) Field of Classification Search
CPC .......... B21J 15/025; B21J 15/04; B21J 15/06; B21J 15/10; B21J 15/105; B21J 15/12; B21J 15/16; B21J 15/386; B21D 39/031; B21D 39/034
USPC ........... 29/432, 432.1, 432.2, 525.05, 525.06, 29/524.1, 243.53, 243.54, 798; 72/409.01, 72/409.12, 453.17, 453.19, 466.4, 453.16; 227/58, 111, 112, 152, 153, 154
See application file for complete search history.

(56) References Cited

U.S. PATENT DOCUMENTS 2,350,002 A * 5/1944 Van Sittert et al. ............. 72/451
2,844,978 A * 7/1958 Hunter et al. .................. 72/432

(Continued)

FOREIGN PATENT DOCUMENTS

| CN | 2472862 Y | 1/2002 |
| CN | 201227678 Y | 4/2009 |

(Continued)

OTHER PUBLICATIONS

European Office Action for EP Application No. 10 768 693.3; dated Feb. 22, 2013; 6 pages.
(Continued)

*Primary Examiner* — Essama Omgba
(74) *Attorney, Agent, or Firm* — Barclay Damon, LLP (57) ABSTRACT

A setting device for connecting at least two components includes a first lever arm having a first working end, and a second lever arm having a second working end, that are pivotably connected to each other like pliers. A first linear drive is connected to the first and the second lever arm so that, by changing of the length of the linear drive, the first and second working ends can move relative to each other. A punch is arranged at a first working end that is connected to a supply module for joining elements, and/or a hold-down module.

5 Claims, 11 Drawing Sheets

(51) Int. Cl.
*B21J 15/12* (2006.01)
*B21J 15/02* (2006.01)
*B21D 39/03* (2006.01)
*B23K 11/31* (2006.01)

(56) References Cited

U.S. PATENT DOCUMENTS

| | | | | |
|---|---|---|---|---|
| 4,180,195 | A | * | 12/1979 | Caley et al. .................. 227/51 |
| 2,532,205 | A | | 10/1985 | Puritz et al. |
| 4,571,975 | A | * | 2/1986 | Pawloski et al. ............... 72/325 |
| 4,765,175 | A | * | 8/1988 | Denham et al. ............. 29/812.5 |
| 5,037,020 | A | * | 8/1991 | Sell ................................. 227/58 |
| 5,040,278 | A | * | 8/1991 | Eckold et al. .............. 29/243.53 |
| 5,375,754 | A | * | 12/1994 | Botha et al. ..................... 227/58 |
| 5,425,262 | A | * | 6/1995 | Dubugnon ...................... 72/450 |
| 5,653,368 | A | * | 8/1997 | Miles et al. ....................... 227/2 |
| 5,752,305 | A | * | 5/1998 | Cotterill et al. .............. 29/432.2 |
| 5,806,362 | A | * | 9/1998 | Dubugnon ................... 72/453.04 |
| 5,964,393 | A | * | 10/1999 | Feldpausch et al. ........... 227/135 |
| 6,385,843 | B1 | * | 5/2002 | Singh et al. ..................... 29/798 |
| 6,427,515 | B1 | * | 8/2002 | Kuhne ........................ 72/453.03 |
| 6,543,115 | B1 | * | 4/2003 | Mauer et al. ............... 29/407.05 |
| 6,725,521 | B1 | * | 4/2004 | Blacket et al. ............. 29/432.2 |
| 6,742,235 | B2 | * | 6/2004 | Blacket et al. ............. 29/432.2 |
| 6,789,309 | B2 | * | 9/2004 | Kondo ............................ 29/709 |
| 7,219,526 | B2 | * | 5/2007 | Herod ........................ 72/453.07 |
| 7,290,431 | B1 | * | 11/2007 | Spivak ......................... 72/452.8 |
| 8,015,686 | B2 | * | 9/2011 | Hain et al. .................. 29/432.2 |
| 8,141,761 | B2 | * | 3/2012 | Draht et al. .................... 227/136 |
| 2001/0025518 | A1 | * | 10/2001 | Hahn et al. ...................... 72/29.2 |
| 2005/0132563 | A1 | | 6/2005 | Schmidt |
| 2006/0243020 | A1 | * | 11/2006 | Herod ........................ 72/453.17 |
| 2007/0049067 | A1 | * | 3/2007 | Hain et al. ...................... 439/74 |
| 2010/0163595 | A1 | * | 7/2010 | Draht ............................ 227/120 |
| 2011/0289763 | A1 | * | 12/2011 | Hain et al. .................. 29/525.06 |

FOREIGN PATENT DOCUMENTS

| | | | |
|---|---|---|---|
| DE | 199 42 390 A1 | 8/2001 | |
| DE | 10 2004 002 974 A1 | 8/2005 | |
| DE | 10 2007 020 167 A1 | 11/2008 | |
| EP | 815980 A1 * | 1/1998 | ............. B21D 39/03 |
| EP | 1132158 A1 * | 9/2001 | ........... B21D 39/031 |
| FR | 357 845 | 1/1906 | |
| FR | 2 532 205 A1 | 3/1984 | |
| WO | WO 92/18264 | 10/1992 | |
| WO | WO 9631319 A1 * | 10/1996 | ................ B25B 5/06 |
| WO | WO 02/078892 A1 | 10/2002 | |
| WO | WO 2004045787 A1 * | 6/2004 | ............. B21D 39/03 |
| WO | WO 2008/131880 A1 | 6/2008 | |

OTHER PUBLICATIONS

Chinese Office Action for CN Application No. 201080052877.5; dated Jan. 10, 2014; 7 pages.
International Search Report/Written Opinion for PCT Application No. PCT/EP2010/006272; mailed Jun. 14, 2011; 14 pages.

* cited by examiner

SETTING DEVICE, SUPPLY MODULE FOR THE SETTING DEVICE, AND A JOINING METHOD FOR CONNECTING AT LEAST TWO COMPONENTS

FIELD OF THE INVENTION

The present invention relates to a setting device for connecting at least two components, especially for punch riveting, a supply module for this setting device, as well as a joining method for connecting at least two components with the assistance of the setting device.

BACKGROUND ON THE INVENTION

In the prior art, setting devices are known that consist of a C-clamp on which a hydraulic setting cylinder is arranged at one end. Such constructions have a large interference contour due to their protruding dimensions. To overcome this disadvantage, a transition was made in the prior art to setting devices that function like pliers. A corresponding example is disclosed in EP 0 550 705 B1. Two levers similar to a pair of pliers are connected to each other at a pivot point. By means of manual actuation or actuation with a linear actuator, the levers are moved such that the working ends on the ends of the levers move towards each other. Joining processes that use the working ends of the levers can be realized in this manner.

Depending upon the application and the joining method to be realized, such setting devices have different designs. Corresponding examples can be found in WO 02/078892, DE 10 2004 002 974 and DE 10 2007 020 167.

It is the object of the present invention to provide a setting device that is optimized in relation to the prior art. This setting device not only has a small interference contour, but also ensures efficient operation.

SUMMARY OF THE INVENTION

The aforementioned object is achieved by a setting device, a supply module, and a joining method according to the accompanying claims. Advantageous embodiments and further developments of the present invention result from the following description, the drawings, and the dependent claims.

At least two components can be connected to each other using the setting device according to the invention. This connection is established for example by punch riveting, clinching, or a similar joining method. The setting device according to the present invention has the following features: A first lever arm having a first working end and a second lever arm having a second working end that are pivotably connected to each other like pliers, a first linear drive connected to the first and second lever arm so that, by changing of the length of the linear drive, the first and second working ends can move relative to each other, and a punch arranged at a first working end that is connected to a supply module for joining elements, and/or a hold-down module.

The setting device according to the invention is formed by a pliers-like construction consisting of two lever arms. The two lever arms are rotatably connected to each other such that the end of the first and second lever arm are arranged opposite each other. These ends of the lever arms are termed working ends. The working ends of the first and second lever arm preferably served to fasten a die and a punch and thereby enable punch riveting processes. Depending on the joining method to be realized, the two opposing working ends are therefore equipped with the corresponding tool and countertool. On the basis of this design, clinching processes can preferably also be performed using the present setting device.

The two lever arms pivotably connected to each other are pivoted with the assistance of a linear drive about a common pivot point. Such a linear drive preferably consists of a hydraulic piston/cylinder drive, a pneumatic piston/cylinder drive, or an electromotor linear drive such as an electric spindle drive.

According to an alternative of the present invention, a supply module for joining elements is arranged at a working end of the first lever arm neighboring the punch of the setting device. This supply module supplies individual joining elements such as semihollow punch rivets to a joining channel to ensure the smooth operation of the setting device. This supply module therefore reduces the downtimes of the setting device and uses the travel time of the setting device to supply a new joining element. According to another alternative, the punch is used at the first working end in combination with a hold-down module. This hold-down module serves to mechanically pretension or retain the components to be connected with each other. An effective setting method is also thereby ensured.

According to a preferred embodiment of the present invention, the punch and/or die arranged at the second working end can be moved by the linear drive along a circular path to establish the connection between at least two components. The construction of the pivotable lever arms is chosen so that at least two components are joined or generally connected on the basis of a movement of the tool and countertool along a circular path. Since the tool, for example the punch, and the countertool, for example the die, move along the same circular path, a reliable connection can be established by means of their interaction.

When using the setting device in combination with the hold-down module, the punch is preferably arranged within a hollow cylindrical hold-down element that can move linearly relative to the punch. According to this embodiment, the hold-down element is connected to a linear drive such that at least two components can be mechanically pretensioned in a pretensioned position of the hold-down element between the hold-down element and the second working end, especially a die.

To connect two components to each other, a semi-hollow punch rivet for example is set between the first and second lever arm solely by means of the linear drive. To mechanically pretension the components to be connected in this construction as well, a hold-down element with its own linear drive is preferably arranged at the first working end of the first lever arm. Due to its hollow cylindrical shape, the hold-down element can be moved with the assistance of the second linear drive independent of the punch at the first working end of the first lever arm. This makes it possible to mechanically pretension the components to be connected before the punch at the first working end of the first lever arm establishes a connection between the two components. It is furthermore preferable to provide the hold-down element with a return spring by means of which the hold-down element can return from the pretensioned position into an initial position.

According to the second alternative of the present invention, the supply module comprises a hollow cylindrical joining channel that can shift linearly relative to the punch and can move the punch. The joining channel preferably has a side opening that is connected to a supply channel by means of which the joining elements can be individually supplied to the joining channel under the punch.

The punch of the setting device preferably moves within a hollow cylindrical joining channel. This joining channel serves the function of holding down and/or supplying the joining elements to prepare for a connection. To this end, joining elements are supplied through a side opening in the joining channel. According to an alternative, a supply channel in the form of a profiled hose, channel, etc. serves to supply the joining elements. In order to individually supply the joining elements to the joining channel below the punch, the joining channel can be linearly shifted in the direction of setting to release the side opening for the punch to supply a joining element. To this end, the setting device preferably has a third linear drive by means of which the joining channel can be shifted into a supply position in conjunction with the supply channel and a joining position. In the supply position, the punch releases the side opening in the supply channel so that a joining element can be supplied to the joining channel. In the joining position, the punch blocks the side opening in the joining channel such that no additional joining element can be supplied to the joining channel, and a setting process can occur.

The joining channel preferably comprises a brake path by means of which a joining element can be braked and/or positioned in the joining channel below the punch.

It is also preferable to connect the setting device to a robot. To this end, the robot is connected to the first or second lever arm to ensure optimum movement of the setting device within space.

The present invention also comprises a supply module for the setting device having the following features: A hollow cylindrical joining channel having a side opening, a supply channel for joining elements that is connected to the side opening of the joining channel, and a linear drive by means of which the joining channel can be linearly shifted between a home position and a supply position.

The joining method according to the invention for connecting at least two components with the assistance of the aforementioned setting device comprises the following steps: The first and the second working end are separated from each other with the assistance of a first linear drive, a joining element is supplied in the joining channel with the assistance of the supply module, at least two components are positioned between the first and second working ends, the working ends are moved towards each other, and the joining elements are joined in at least two components with the assistance of the first linear drive.

BRIEF DESCRIPTION OF THE ACCOMPANYING DRAWINGS

The present invention is explained in greater detail using the accompanying drawings. They show in.

DETAILED DESCRIPTION OF THE PREFERRED EMBODIMENTS

Figure 1:
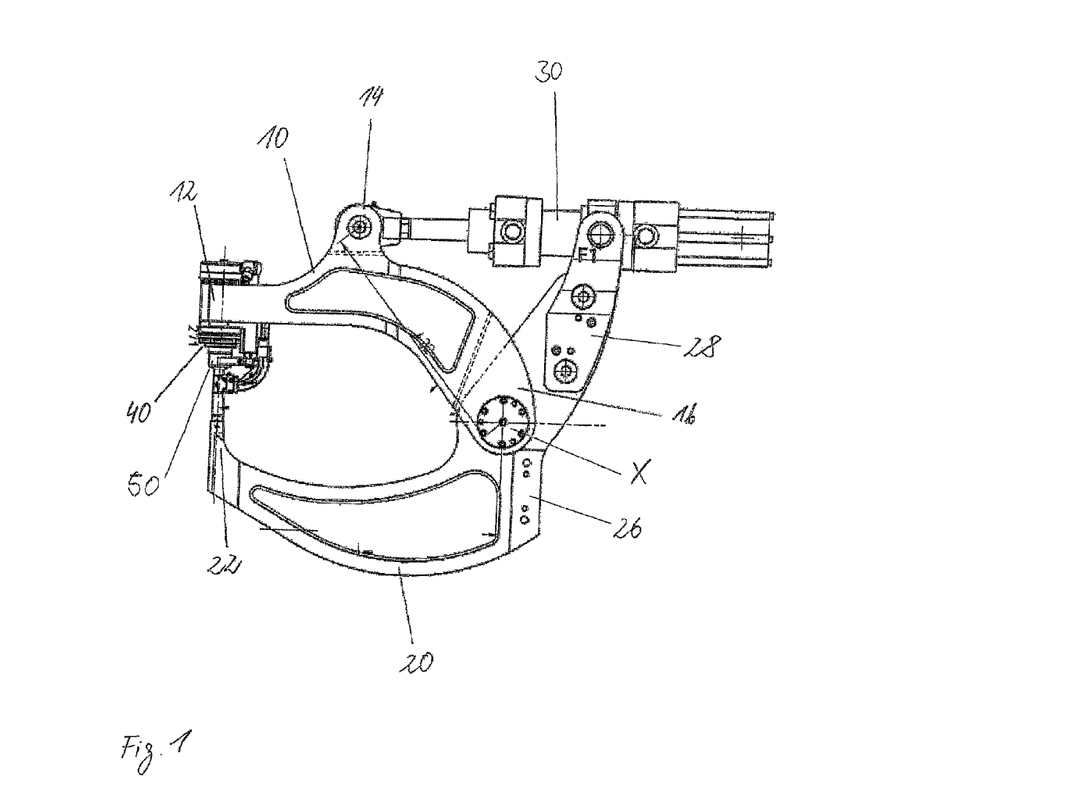
FIG. 1 A side view of a preferred embodiment of the setting device according to the invention, FIG. 2 A side view of the embodiment from FIG. 1 in an open state, FIG. 3 A perspective view of another embodiment of the setting device according to the invention, FIG. 4 An enlarged sectional representation of the setting head from FIG. 3, FIG. 5 A sectional representation of the preferred embodiment of the setting head of the present invention in an initial position, FIG. 6 The setting head from FIG. 5 in a supply position, FIG. 7 The setting head from FIG. 5 with a supplied rivet, FIG. 8 The setting head from FIG. 5 in a held-down position on the component, FIG. 9 The setting head from FIG. 5 in a joining position, and FIG. 10 A flowchart of a preferred embodiment of the joining method according to the invention, and FIG. 11A-C A preferred embodiment of the setting device according to the invention with a slider crank/toggle lever drive in combination with an electric motor.

A preferred embodiment of the setting device 1 according to the invention is shown in FIG. 1. In order for the interference contour of the setting device 1 to be small, the conventional C-frame of setting devices is designed in two parts in this case. It consists of a first lever arm 10 and a second lever arm 20. The lever arms 10, 20 are pivotably connected to each other at pivot point X. On the basis of this construction, they form a pliers-like arrangement that is actuated by means of a linear drive 30. The linear drive 30 applies the joining force, for example to connect at least two components B to each other. The linear drive 30 is preferably a hydraulic or pneumatic piston/cylinder drive, or an electromotive actuator such as an electric spindle drive. Other drive systems are also conceivable that automatically change length.

It is also preferable to use a slider crank/toggle lever mechanism 11, 21, 13, 17 in combination with an electric motor M as the linear drive for the lever arms 10, 20 of the setting device 1. An example of this preferred embodiment of the setting device 1 is shown in FIGS. 11A to C.

Figure 11A:
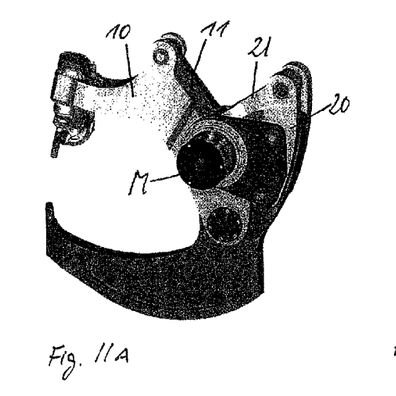
Figure 11B:
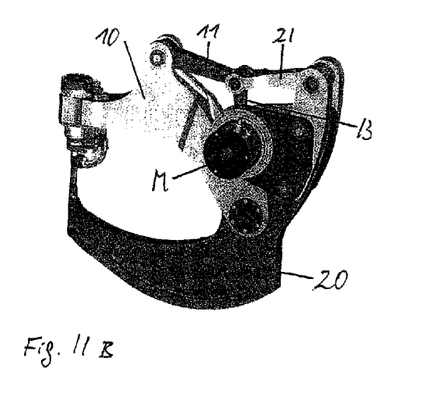
Figure 11C:
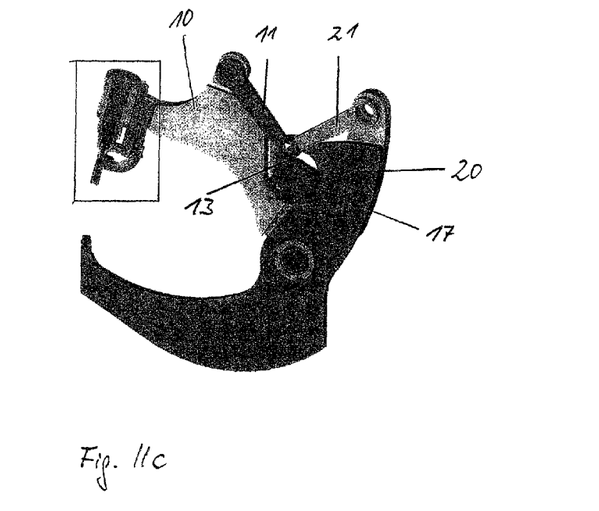

FIG. 11A shows the two levers 10, 20 of the setting device that are pivotably connected to each other at pivot point X. The levers 10, 20 can be moved by the aforementioned slider crank/toggle lever drive 11, 21, 13, 17. The toggle lever drive consists of arms 11, 21, where arm 11 is connected to lever 10, and arm 21 is connected to lever 20. The arms 11, 21 form the toggle lever of the toggle lever drive.

A connecting rod 13 at one end in each case is movably connected to an end of the arms 11, 21. The other end of the connecting rod 13 is arranged eccentrically on a rotatable disc 17 so that they jointly form a slider crank. The disc 17 is rotated by an electric motor M. The movement of the connecting rod 13 along the circular path dictated by the disc 17 enlarges or decreases the angle between the arms 11, 21. The levers 10, 20 of the setting device 1 are thereby correspondingly moved to execute a joining process, or to open the setting device to remove or insert components. By way of illustration, FIG. 11B shows the open setting device 1. When the electric motor M and hence the disc 17 rotate, the connecting rod 13 is moved such that the arms 11, 21 enclose a smaller angle than when the setting device 1 is closed, or during the joining process of the setting device 1. If the electric motor M and hence the disc 17 rotate, the connecting rod 13 is moved toward the arms 11, 21. This movement increases the angle enclosed by the arms 11, 21. At the same time, this movement closes the arms 10, 20 of the setting device to execute a joining process, for example.

Toward the end of the joining process, the toggle lever 11, 21 is nearly extended. The same holds true for the connecting rod 13 with the disc 17 that is aligned approximately at a right angle to the perimeter of the disc 17 (see FIG. 11C). The geometric arrangement of the toggle lever 11, 21 and connecting rod 13/disc 17 generates high joining forces in the setting device 1 by means of the leverage of the slider crank/toggle lever drive despite the low torque of the electric motor M.

Alternative to the combination of a connecting rod 13 and disc 17, it is also preferable to spread the toggle lever 11, 21 with a linear drive that contacts the connecting site between the arms 11, 21 (not shown) instead of the connecting rod 13.

According to another embodiment, the lever arms 10, 20 are formed by profile structures to save weight in comparison to the solid material constructions. In addition, the length of the first lever arm 10 is minimized. This also reduces the weight of the setting device and decreases its interference contour. To this end, the rotary connection to the second lever arm 20 is arranged at one end 16 of the first lever arm 10. At the other end of the first lever arm 10 is the first working end 12 with a setting head 40, 50 (see below). The linear drive 30 is fastened to the first lever arm 10 between the first working end 12 and the end 16. This also reduces the interference contour of the setting device 1 because the linear drive 30 runs partially parallel to the first lever arm 10. Furthermore, the shape of the first lever arm 10 ensures that the setting device 1 has a more compact construction in comparison to the prior art.

The second lever arm 20 comprises a second working end 22 on which a die 60 is preferably arranged. It is also conceivable to fasten another countertool at the second working end 22 that interacts with the tool, such as the punch 70, at the first working end 12.

Figure 2:
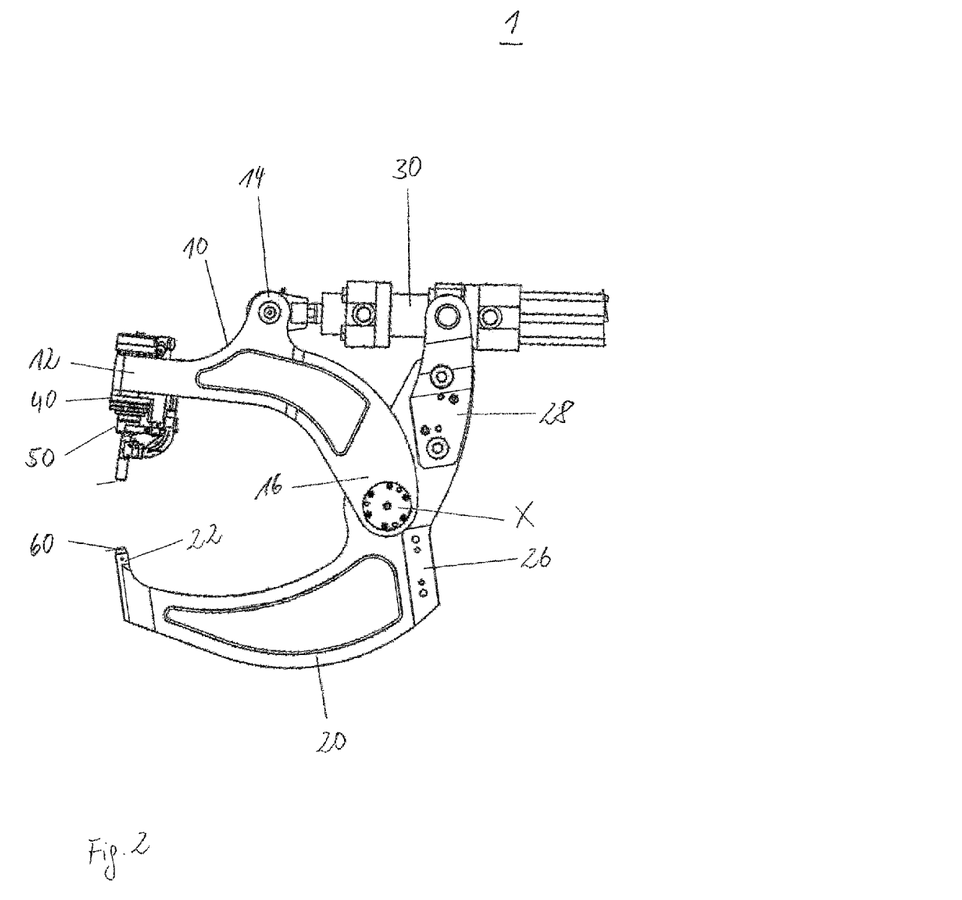
Figure 10:
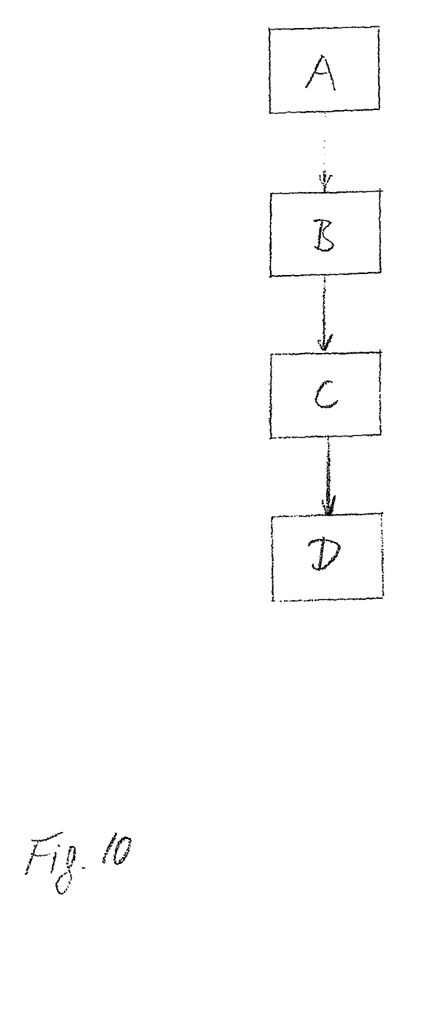

The end 28 of the second lever arm 20 extends beyond the rotary connection X. The linear drive 30 is connected to the end 28 so that the setting device 1 is actuated as its length changes. If the length of the linear drive 30 is reduced (step A, FIG. 10), the pliers-like arrangement of the lever arms 10, 20 opens the setting device 1. This state is illustrated in FIG. 2. While the setting device 1 opens, the first 12 and second working end 22 move apart from each other. When the linear drive 30 extends (step D, FIG. 10), the working ends 12, 22, and the tool 40, 50 and counter tool 60 connected to them, move toward each other along a circular path. The joining process of the setting device 1 also occurs along a circular path based on this movement. A joining drive such as a setting cylinder is therefore not necessary at the first 12 or second working end 22.

The setting device 1 is preferably moved into the joining positions with the assistance of a robot (not shown). The robot is connected to the setting device 1 at the attachment site 26 for the second lever arm 20. Due to the arrangement of the linear drive 30 according to FIG. 1, the center of gravity of the setting device 1 is approximately at the level of the attachment site 26. This makes the setting device 1 easier to handle and move in comparison to when the center of gravity of the setting device is shifted toward the working ends 12, 22.

Figure 3:
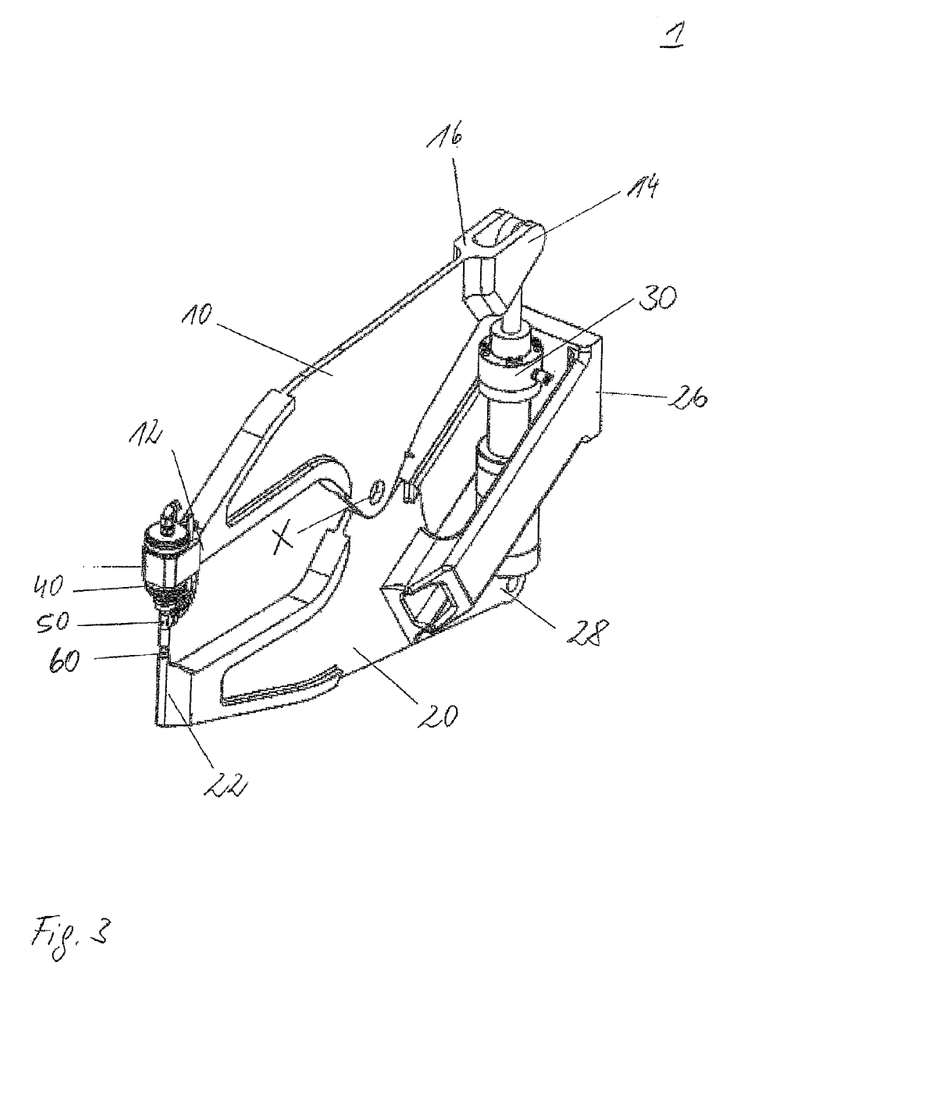

FIG. 3 shows another preferred embodiment of the setting device 1. In comparison to the setting device 1 in FIG. 1, functionally similar components are designated with the same reference numbers. It can be seen that the first lever arm 10 extends beyond the connecting pivot point X. The linear drive 30 is fastened to its end 16 at point 14.

Figure 4:
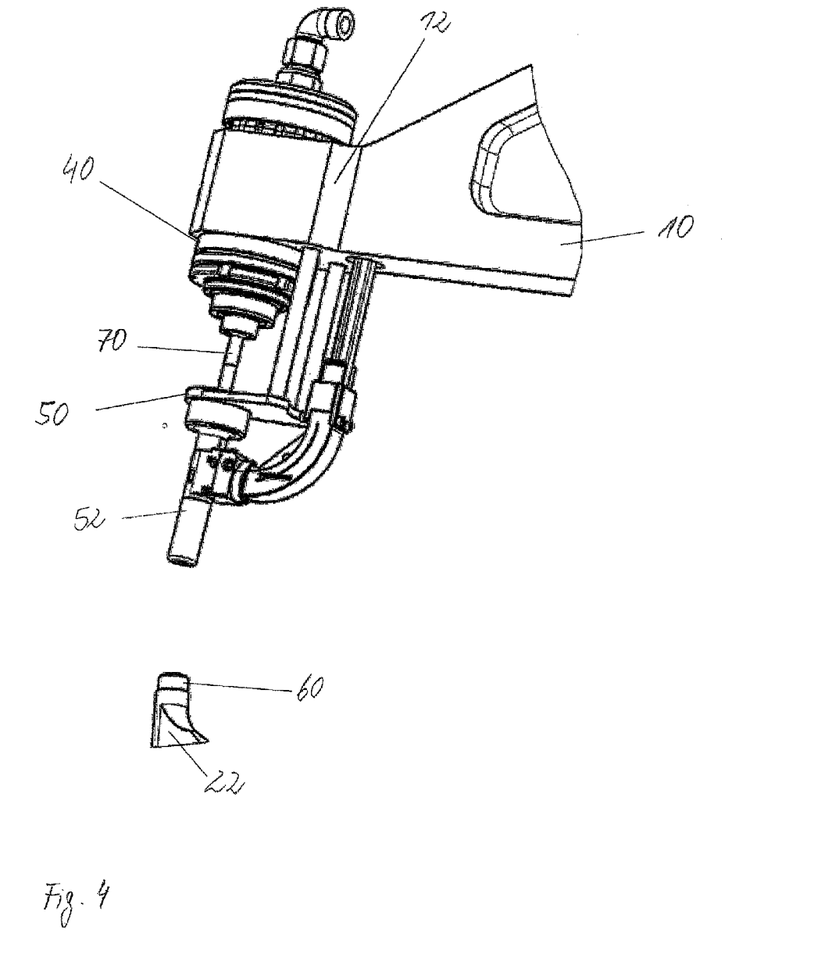

FIG. 4 shows an enlarged representation of the working ends 12, 22. The die 60 is preferably arranged as a countertool at the second working end 22. The setting head 40, 50 with the punch 70 as the tool is located at the first working end 12. The setting head comprises a hold-down module 40 and/or a supply module 50 as explained further below. The hold-down module 40 serves to mechanically pretension the components B during or after joining. The supply module 50 supplies individual joining elements 90 such as semihollow rivets, solid rivets, and similar familiar joining elements in a joining channel 52 of the setting device 1.

Figure 5:
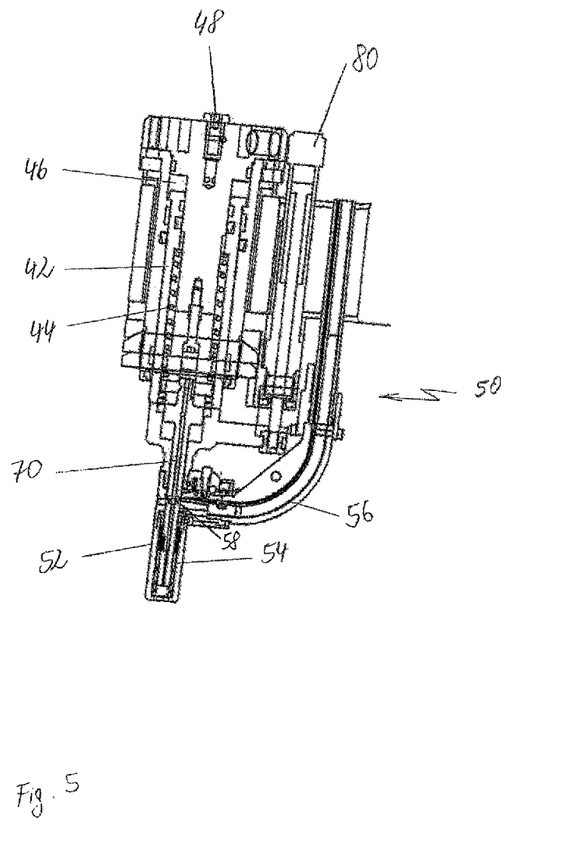

FIG. 5 shows an enlarged sectional view of the preferred setting head 40, 50 in an initial position. The setting device 1 (not shown) is in an open state as shown in FIG. 2. As explained above, the setting head comprises the hold-down module 40 and/or the supply module 50.

To establish a connection between two components B (see FIG. 8), the punch 70 is connected to the first working end 12. The punch 70 moves within the hollow cylindrical joining channel 52. When the setting device 1 comprises the hold-down module 40, the hollow cylindrical joining channel 52 preferably abuts on a hollow cylindrical hold-down element 42. Together with the joining channel 52, the hold-down element 42 can be linearly shifted relative to the punch. Whereas the hold-down element 42 in FIG. 5 is shown in an initial position, it is in a joining position in FIG. 9.

The hold-down element 42 is moved parallel to the longitudinal axis of the punch 70 with the assistance of a linear drive 46, 48. This linear drive 46, 48 is preferably based on the same drive principles as the first linear drive 30 ((see above). According to the preferred embodiment shown in FIG. 5, the hold-down element 42 is designed as a hollow cylindrical piston. The hold-down element 42 is pneumatically or hydraulically actuated via the chamber 46 and connection 48. The hold-down element 42 is supplied with a specific pressure via chamber 46 and hence a specific hold-down force. Once the joining channel 52 lies on the components B, the hold-down force from the chamber 46 is transferred via the hold-down element 42 and joining channel 52 to the components B. If the hold-down force on the component B is exceeded as the setting device 1 is closed, the hold-down element 42 escapes into chamber 46 to maintain the specified hold-down force. This can be realized by specifically controlling the media in the chamber 46, or by controlling the force of the linear drive 46, 48.

Moreover, to move the hold-down element 42 out of the joining position or pretensioned position back into its initial position, it preferably comprises a return spring 44. The return spring 44 surrounds the hold-down element 42 and is coaxial thereto. If the hold-down element 42 moves into the chamber 46, the return spring 44 is subject to traction. After the hold-down element 42 is released, the return spring causes the hold-down element 42 to return to its initial position.

According to another alternative, the present invention comprises the supply module 50. A preferred embodiment of the supply module 50 is also shown in FIG. 5. The supply module 50 comprises the joining channel 52 which is designed to be releasable from the hold-down element 42. In addition, the joining channel 52 is connected to a linear drive 80. The linear drive 80 causes the joining channel 52 to move in the longitudinal direction of the punch 70 in order to supply individual joining elements 90 to the joining channel 52. The linear drive 80 works according to similar drive alternatives that were cited in conjunction with the linear drive 30.

The joining channel 52 also comprises a side opening 58 by means of which a supply channel 56 is connected to the joining channel 52. Joining elements 90 are supplied to the joining channel 52 by means of the supply channel 56. At its outlet into the joining channel 52, the supply channel 56 preferably comprises a controllable locking pawl 57. The locking pawl 57 selectively releases the opening 58 so that a joining element 90 can be transported into the joining channel 52. Such a control is preferrably executed by a control unit connected to the setting device 1.

Furthermore, the joining channel 52 preferably comprises a braking path 54. The braking path 54 preferably brakes a joining element 90 and/or positions it below the punch 70 when the joining element 90 has been supplied to the joining channel 52. The braking path 54 comprises braking bars or brake shoes or discs that extend radially into the joining channel 52.

While the setting device 1 is operating, the setting device first opens (step A, FIG. 10) as shown in FIG. 2. Then the working ends 12, 22 are separated from each other to a maximum extent with the assistance of the linear drive 30. The hold-down element 42 and the supply module 50 are in the initial position shown in FIG. 5.

Figure 6:
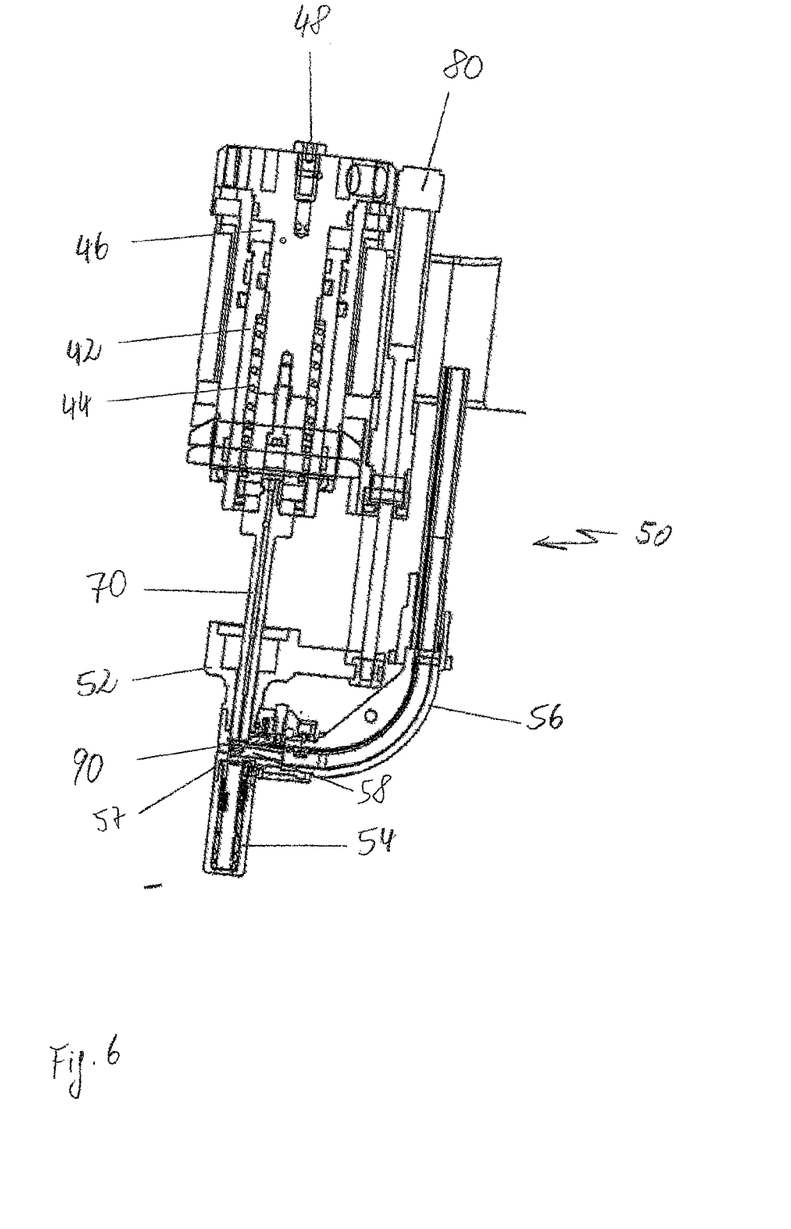

The linear drive 80 is then extended according to FIG. 6. By this, the joining channel 52 with the supply channel 56 are shifted in the joining direction of the punch 70 until the punch 70 releases the opening 58. The supply channel 56 preferably consists of a profile channel in which a plurality of joining elements 90 (not shown) wait at the locking pawl 57. The locking pawl 57 releases a joining element 90 in a controlled manner such that this joining element 90 enters through the opening 58 into the joining channel 52 (step B). Within the joining channel 52, the joining element 90 is held by the braking path 54 so that it cannot initially leave the joining channel 92.

Figure 7:
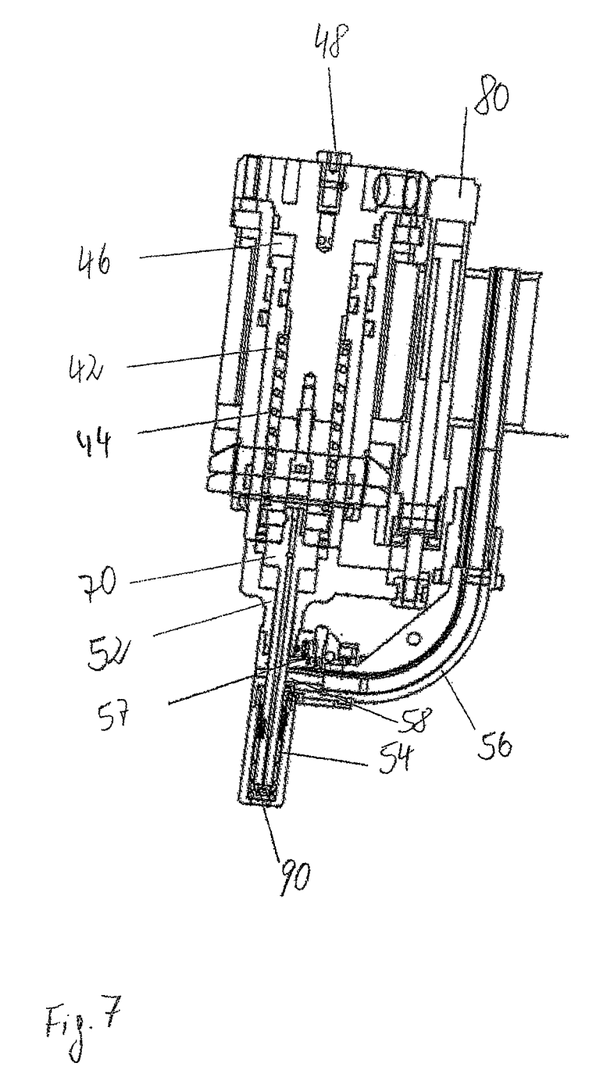

After the joining element 90 has been supplied to the joining channel 52, the linear drive 80 is again shortened. This causes the supply module 50 to return to its initial position according to FIG. 7. The joining element 90 is then positioned close to the open end of the joining channel 52 at the bottom of the punch 70.

Figure 8:
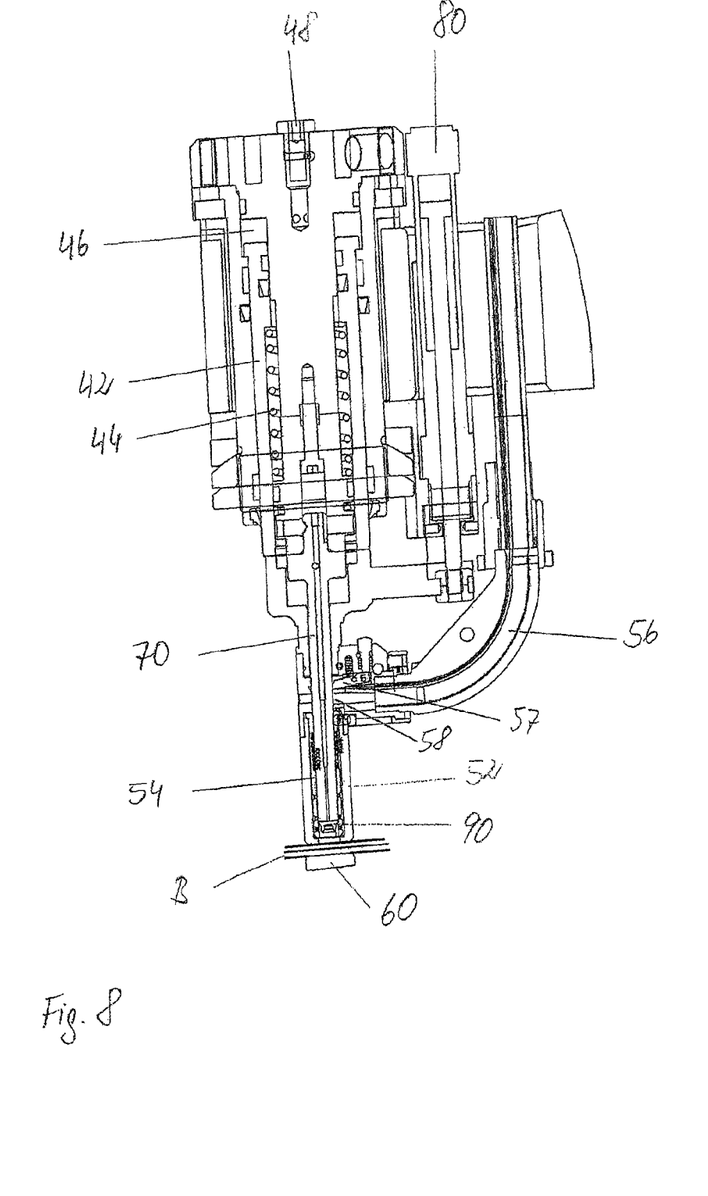
Figure 9:
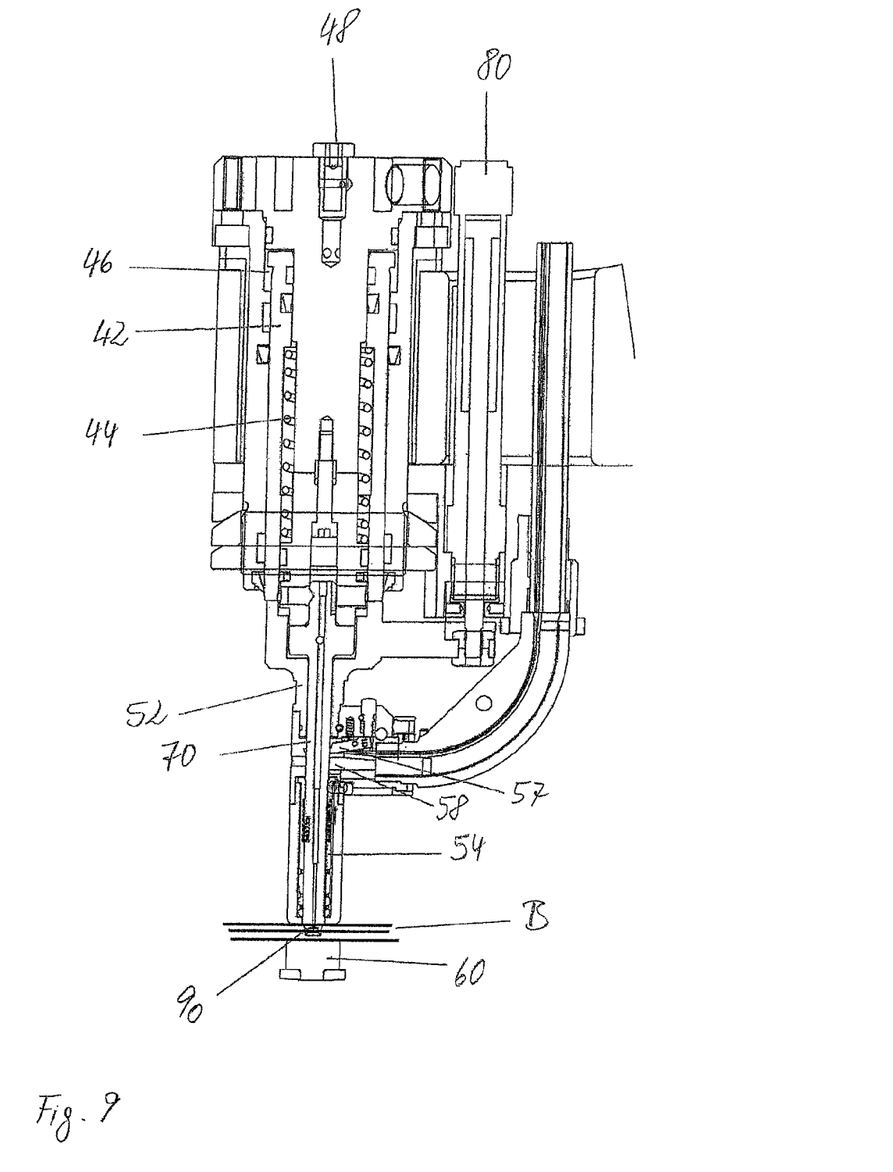

The setting device 1 is then moved to the joining site. This movement is for example generated by the robot connected to the setting device 1. The setting device 1 is closed at the joining site as shown in FIGS. 1 and 8. The working ends 12, 22 are moved towards each other until the die 60 and joining channel 52 lie on components B (step C).

While the linear drive 30 continues to extend and the setting device 1 closes further, the components B are pretensioned with a specific hold-down force by the joining channel 52 and the hold-down element 42. The hold-down force is set by the linear drive 46, 48 (see above).

The linear drive 30 extends further to join the joining element 90. The punch 70 presses the joining element 90 into the components B (step D). To keep the hold-down force from increasing during the setting movement of the punch 70 toward the components, or to keep the hold-down element 42 from shutting down, the hold-down element 42 yields with the joining channel 52 against the joining direction. The hold-down element 42 thereby moves into the chamber 46 according to the preferred embodiment in FIG. 9. The linear drive 46, 48 therefore dictates a force-controlled shortening so that the hold-down force remains constant, reduces or is stopped. In the same manner, the hold-down force can be increased during the setting process by controlling the linear drive 46, 48.

After the joining element 90 has been set, the control device 1 opens, and the hold-down element 42 with the joining channel 52 returns to its initial position according to FIG. 5.

The invention claimed is:

1. A setting device for connecting at least two components, said device comprising:
    a first lever arm having a first working end and a second lever arm having a second working end that are pivotably connected to each other like pliers at a pivot point;
    a first linear drive connected to the first and the second lever arms such that by extension of the first linear drive, the first and second working ends are moved towards each other and by contraction of the first linear drive, the first and second working ends are moved away from each other; and
    a punch arranged at the first working end that is connected to a hold-down module, wherein one of said punch and a die arranged at the second working end is movable by the first linear drive along a circular path to establish the connection between at least two components, and wherein said punch is arranged within a hollow cylindrical joining channel as a hollow cylindrical hold-down element at the first working end of the first lever arm which is movable by a second linear drive relative to the punch into a pretensioned position of the hold-down element, wherein the hold-down element is resettable by a return spring from the pretensioned position into an initial position wherein a supply module comprises a hollow cylindrical joining channel that can shift linearly relative to the punch and can move the punch, the joining channel comprising a side opening that is connected to a supply channel that enables the joining elements to be individually supplied to the joining channel under the punch and in which the joining channel can be shifted with the supply channel into a supply position and a joining position by means of a third linear drive, such that in the supply position, the punch releases the side opening in the joining channel so that a joining element can be supplied to the joining channel; and in the joining position, the punch blocks the side opening in the joining channel so that no joining element can be supplied to the joining channel.

2. The setting device according to claim 1, wherein the hold-down element is connected to the second linear drive such that at least two components can be mechanically pretensioned in the pretensioned position of the hold-down element between the hold-down element and the second working end.

3. The setting device according to claim 1, in which the first linear drive consists of a slider crank/toggle lever drive in combination with an electric motor.

4. The setting device according to claim 1, wherein the joining channel comprises a brake path by means of which a joining element can be at least one of braked and positioned in the joining channel below the punch.

5. The setting device according to claim 1, in which the joining channel forms a releasable part of a hollow cylindrical hold-down element in which the punch is arranged.

* * * * *